United States Patent [19]

Abrahamson

[11] Patent Number: 4,809,408

[45] Date of Patent: Mar. 7, 1989

[54] SHIELDED WEDGE-TYPE CABLE CLAMP

[76] Inventor: Thomas C. Abrahamson, 819 E. Melendy St., Ludington, Mich. 49431

[21] Appl. No.: 98,919

[22] Filed: Sep. 21, 1987

[51] Int. Cl.⁴ ............................................. F16G 11/04
[52] U.S. Cl. ............................. 24/136 K; 24/115 M; 403/211
[58] Field of Search ............. 24/136 K, 136 R, 136 L, 24/115 M; 403/211

[56] References Cited

U.S. PATENT DOCUMENTS

| | | | |
|---|---|---|---|
| 2,085,333 | 6/1937 | Reynolds | 403/211 |
| 2,482,231 | 9/1949 | White | 24/136 K |
| 2,977,654 | 4/1961 | Page | 403/211 |
| 3,004,317 | 10/1961 | Page | 403/211 |
| 3,905,711 | 9/1975 | Rogers | 403/211 |
| 4,561,154 | 12/1985 | Briscoe et al. | 24/136 K |
| 4,602,891 | 7/1986 | McBride | 403/211 |

*Primary Examiner*—Victor N. Sakran
*Attorney, Agent, or Firm*—Glenn B. Morse

[57] ABSTRACT

A wedge-type cable clamp has an outer member providing an open-ended tapered recess receiving a wedge around which a cable is wrapped in the usual manner. The wedge projects beyond the larger end of the recess, and the sides of the outer member extend past the wedge to shield it against random accidental forces. A cut-out in the sides provides finger access for intentionally releasing the clamp.

1 Claim, 1 Drawing Sheet

SHIELDED WEDGE-TYPE CABLE CLAMP

BACKGROUND OF THE INVENTION

Deep-water trolling for fish has generated a type of equipment commonly referred to as a "downrigger" system, which includes a reel of fine steel cable extending from a gunwale or stern mounting of the reel down to a sizeable weight that positions the bait at the desired depth. Pull-free clips on the weight or on the cable immediately adjacent to it hold the fish line temporarily until the bait has been hit, at which time the line is pulled free of the clip. The line then extends directly to the fishing pole for manipulation by the fortunate fisherman. The downrigger system should be easily attached and dismounted, since it is clearly undesireable to leave valuable equipment exposed during periods in which the boat is not in use. Obviously, this is facilitated by making the sections of the downrigger systems detachable from each other. The cable and reel form a unit for ease of handling, and the attachment of the cable to the weight forms a convenient point for separating the weight from the cable and reel. The cable is commonly connected to the weight with a swivel to allow for relative rotation between the weight and the cable under cable tension, and the attachment of the swivel to the cable has commonly been through the use of a wedge-type cable clamp. These devices have an outer member providing an open-ended tapered inner recess receiving a wedge having a side configuration similar to that of the taper of the recess. The cable is slipped endwise into the gap between the wedge and the wall of the recess when the wedge is retracted somewhat out of the larger end of the recess. The cable is then wrapped around the end of the wedge, and back through the space between the wedge and the recess wall. A light push against the large end of the wedge tending to shove it into the recess, together with a pull on the cable, will lock the wedge into position with sufficient solidity to withstand the breaking strength of the cable.

One problem with these common devices is their vulnerability to loosening the wedge action as a result of shock against the side of any projecting portions of the wedge. Completely covering the wedge produces a problem when it is necessary to disconnect the cable clamp when the system is no longer in use.

SUMMARY OF THE INVENTION

A wedge-type cable clamp has an outer member providing an open-ended tapered recess receiving a wedge around which a cable is wrapped. When the wedge is in clamping position, it is shielded by side extensions of the outer member which terminate well beyond the end of the wedge, where aligned holes are provided for receiving the cross pin of a conventional swivel connector. The side extensions of the outer member shield the projecting portions of the wedge, and are provided with a cutout giving finger access for intentionally releasing the wedge action.

DESCRIPTION OF THE PREFERRED EMBODIMENT

Figure 1:
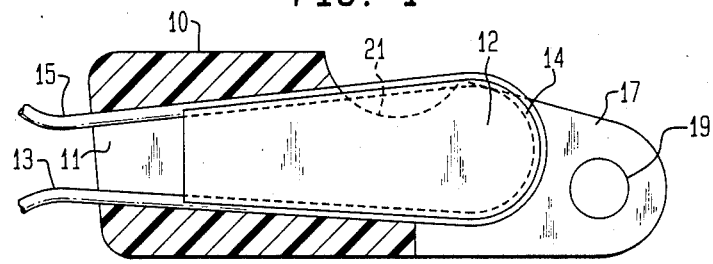
FIG. 1 is a sectional elevation of the assembled device, with a cable wrapped around the wedge member, and with the wedge in a position prior to the application of substantial tension in the cable.
Figure 3:
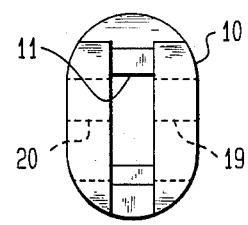
FIG. 3 is an end view of the outer member.
Figure 4:
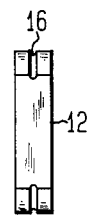
FIG. 4 is an end view of the wedge.

The cable clamp illustrated in the drawings includes an outer member 10 providing a tapered inner recess 11 receiving a wedge 12. When the clamp is in use, a cable 13 is wrapped around the wedge in the manner shown in FIG. 1 by first inserting it end-wise from the left underneath the wedge member, and around the larger end 14, after which it is worked through the recess on top of the wedge so that a free end 15 is formed. Referring to FIG. 4, the wedge has a groove 16 for locating the cable properly in the grip of the device. A semi-circular groove depth of 0.015 inches in radius is recommended, which experience has indicated will accommodate cables from 1/64th to a 1/16th of an inch in diameter. These cables are of stainless steel, and the usual cable diameter of a thirty-second of an inch may well have a breaking strength of around three hundred pounds. For this range of cable size, the convergence of the recess, and of sides of the wedge, should be in the neighborhood of six to seven degrees. The thickness of the wedge can be on the order of a tenth of an inch, and the overall length of the wedge approximately one and three sixteenths of an inch. The drawings are obviously rendered on an increased scale over actual size. The width of the wedge at its smaller end should be in the neighborhood of three tenths of an inch. It has been found desireable to manufacture the wedge and the outer member of a moldable plastic material commonly referred to as "ABS" plastic. This material appears to be manufactured at least by Dow Chemical Company, and it is perferable that this material should have fiberglass inclusions to the extent of approximately thirteen percent to develop high strength capabilities.

Figure 2:
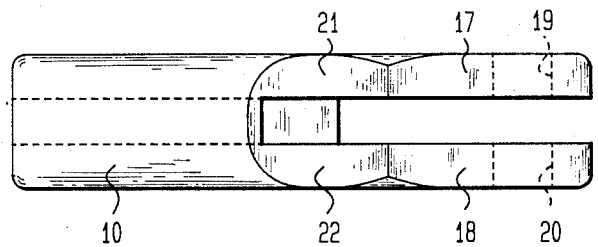
FIG. 2 is a top view of the outer member of the clamp.

The sides of the outer member indicated at 17 and 18 in FIG. 2 extend well beyond the larger end 14 of the wedge to shield it from accidental jarring action from side forces. The sides 17 and 18 provide aligned holes as shown at 19 and 20 for receiving the cross pin of a conventional swivel. The sides 17 and 18 also have aligned cut-outs as shown at 21 and 22 providing finger access to the wedge. As tension is applied to the cable 13, the wedge tends to move to the left, as viewed in FIG. 1. This movement continues until the wedge is almost entirely concealed by the sides 17 and 18, except for the presence of the cutout areas 21 and 22. These permit a manual grasp of a portion of the wedge to break the locking action of the wedge, and release the cable when it is desired to detach the weight.

I claim:

1. A cable clamp having an outer member defining an inner converging recess having large and small end openings, said outer member having substantially parallel sides extending beyond said large opening, and also including a wedge member receivable in said recess, and having a large arcuate end and a smaller end, and a converging configuration similar to that of said recess, said arcuate and smaller ends being joined by portions tangential to said arcuate end, wherein the improvement comprises:

a dimensional relationship between said recess and said wedge member wherein said large end of said wedge member extends beyond said large end opening of said recess at extreme penetration of said wedge member into said recess; and said outer member sides extend opposite and beyond said wedge member larger end and having a terminal connection, said sides having a cut-out adjacent said wedge member larger end exposing a sufficient length of one of said tangential portions to provide manual access thereto, while shielding a major portion of said arcuate end.

* * * * *